United States Patent Office 3,421,913
Patented Jan. 14, 1969

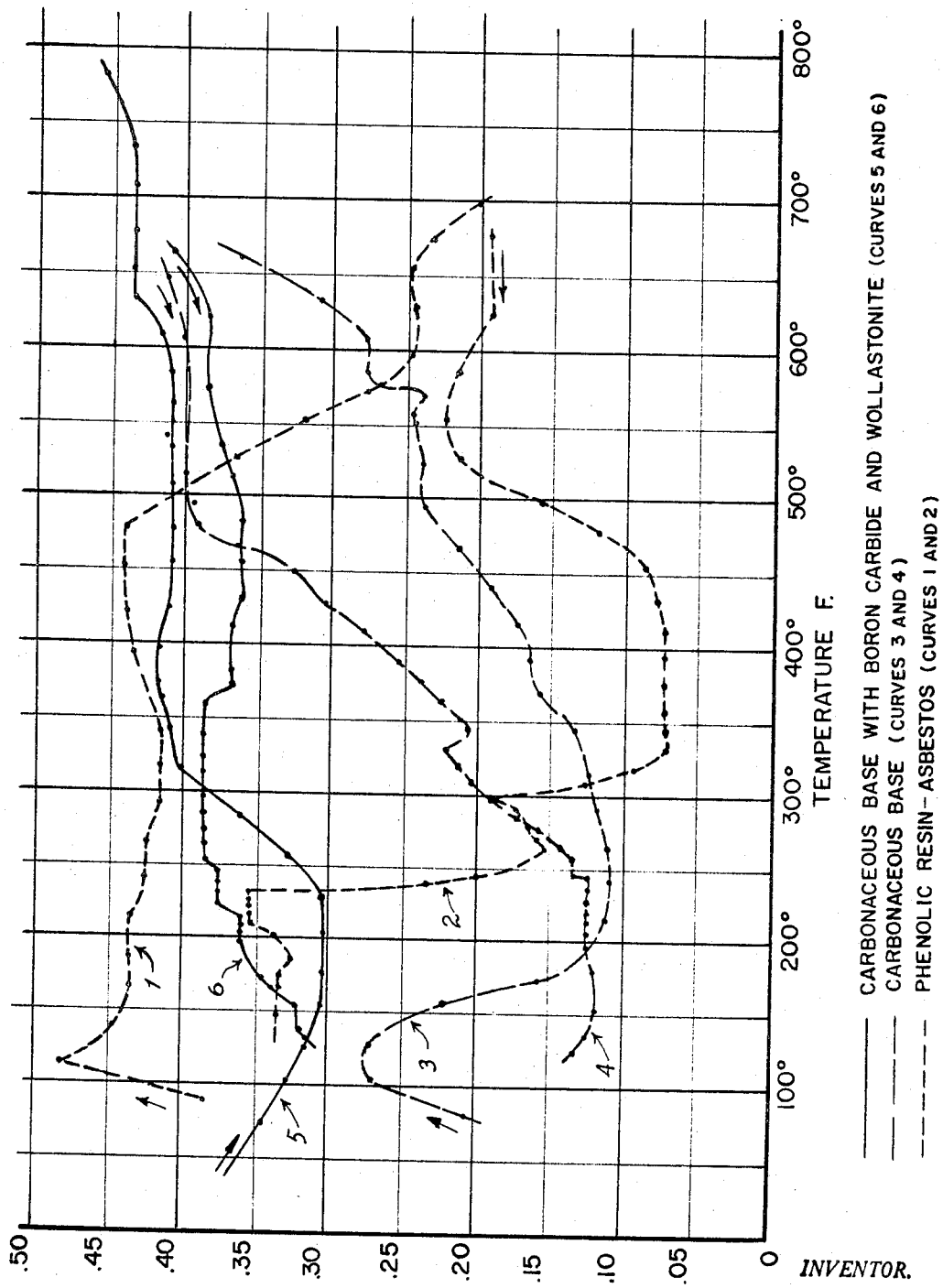

3,421,913
METHOD OF STABILIZING FRICTION COEFFICIENT OF CARBONACEOUS BASE MATERIALS AND THE PRODUCTS THEREOF
John B. Falcettoni, Kersey, Pa., assignor to Air Reduction Company, Incorporated, New York, N.Y., a corporation of New York
Filed Nov. 12, 1964, Ser. No. 410,634
U.S. Cl. 106—36    3 Claims
Int. Cl. C09k 3/14

ABSTRACT OF THE DISCLOSURE

A method of stabilizing the coefficient of friction of an essentially carbonaceous base material between about 0.25 and about 0.45 over a temperature range from ambient to about 800° F. by including in the carbonaceous base material boron carbide in amount from about 7% to about 10% by weight thereof, and wollastonite in amount from about 3% to about 5% by weight thereof.

---

This invention relates to a method of modifying, controlling, and stabilizing under variable temperature the friction coefficient of carbon-graphite materials, and to the improved products derived from the method.

Carbon, graphite, mixture thereof, and metal-graphite materials, sometimes referred to herein collectively as carbonaceous materials, or simply by the generic name carbon, have certain characteristics which are desirable in friction materials. These carbonaceous materials have outstanding ability to withstand high temperatures without damage or alteration, for example temperatures such as are encountered in automobile brakes. Such materials have the further advantage that they can be run against iron, steel, copper, brass, or other metal mating surfaces without damage to the mating surface. However, investigation has disclosed that carbonaceous materials heretofore available are not ideally suited for use as friction materials because of the lack of stability of the friction coefficient with temperature changes normally encountered in such applications. The instability of friction coefficient with temperature in the phenolic resin-asbestos and similar compositions commonly used as automobile brake lining materials is well known. A great amount of time and effort has been expanded in attempts to provide a relatively stable brake friction material which would eliminate fading and grabbing of automobile brakes, but the answer has not been found in the known resin-asbestos materials. The lubricating properties of graphite are known and many carbonaceous materials are unsatisfactory for use in clutch and brake linings and similar friction applications for the further reason that the coefficient of friction against the mating surface, such as cast iron, is too low to permit proper functioning of the friction unit.

In the industrial carbon field many different base compositions are used and the number of these compositions and the various grades made therefrom runs into many thousands of formulations. For the most part, such formulations are held by industrial carbon manufacturers as proprietary information and are not available to the public, or even to the users of the end products. The physical and electrical characteristics of the end product made from any particular carbonaceous composition depend on many factors entering into the formulation, including the origin of the component materials and their processing, and the processing of the mixture, and these characteristics cannot be predicted with certainty or accuracy. The problem inherent in designing and producing industrial carbon products to given specifications are well known.

It is an object of this invention to provide an improved method of stabilizing the coefficient of friction of carbonaceous materials from atmospheric temperature to about 800-900 F. It also is an object of this invention to provide new and improved brake friction materials. Another object of the invention is to provide improved carbonaceous base brake friction materials. Still other objects and advantages of the invention will be pointed out or will become apparent as this description proceeds.

I have found that the coefficient of friction of certain carbon (generic) compositions can be modified and can be stabilized, over certain temperature ranges at least, by the addition of boron carbide. I have discovered that by adding appropriate amounts of boron carbide to certain base carbon (generic) compositions that exhibit unstable coefficient of friction with temperature change it is possible to produce materials having relatively stable coefficients of friction with temperature change. I have discovered that in some cases the coefficient of friction is raised at room temperature and over the entire temperature range tested by the addition of boron carbide. I have found that this modification and control of friction by the addition of boron carbide applies to various carbon (generic) materials, including molded gas baked materials, molded graphitized materials, molded sintered materials, extruded gas baked materials, and extruded graphitized materials, although not necessarily in like manner and degree for all of these materials.

The boron carbide, which has a higher coefficient of friction than the base materials, does not function in the carbonaceous material solely as an added abrasive. For example, I have demonstrated that a carbonaceous material containing 10% boron carbide and having a stabilized friction coefficient over a wide temperature range does not produce any more wear on the mating surface, such as cast iron, than does the base material without the boron carbide. These tests involved running samples of the materials against a cast iron disc for 12 hours at 350 feet per minute, followed by 8 hours at 25 feet per minute.

I have found also that other abrasive materials can be used advantageously in conjunction with boron carbide to raise the coefficient of friction of certain carbonaceous materials to the desired level. As an example, one material which I have found to be particularly suitable for this purpose is wollastonite, which is native calcium metasilicate $CaSiO_3$.

While the present invention will be described more particularly with reference to automobile brake applications, this is merely by way of illustration and is not to be construed as a limitation on the scope of the invention, which will be defined in the claims.

Friction material for automobile brakes ideally would have a coefficient of friction of about 0.4 which would remain constant over the entire operating temperature range. If the friction coefficient can be kept within a range between about 0.35 and about 0.45 over all or most of the operating temperature range the stability would be considered optimum for all practical purposes. The friction coefficient might even drop as low as about 0.2 for a limited period and still be acceptable. The friction coefficient desirably should not exceed about 0.45 (0.6 sliding), because this would be likely to result in locking or grabbing, with erratic operation and excessive wear on the mating surface.

In the absence of any material having a stable friction coefficient, the coefficient desirably should not change more than 20% over any 200° F. range from atmospheric temperature to about 800° F. to 900° F., which is above the temperature desired in automotive brakes.

The stability of the friction coefficient for friction materials is not necessarily the same for rising temperatures or for falling temperatures. The reasons for this are not fully understood, but it is believed that this may be due, in part at least, to changes resulting from the driving off of moisture as the temperature rises. In the materials of the present invention the stabilization of the friction coefficient over both rising and falling temperatures is improved and the curves for rising and falling temperatures more nearly approach coincidence than is the case with the conventional phenolic resin-asbestos brake lining materials.

The relation of friction coefficient to temperature for a number of materials on both rising and falling temperatures is shown in the graph constituting the single figure of the drawings.

The curve designated 1 shows the friction coefficient-temperature relation for a conventional phenolic resin-asbestos brake lining material on rising temperatures, and curve 2 shows the friction coefficient-temperature relation for this same material on falling temperatures. These curves are included for purposes of comparison to demonstrate the improved friction coefficient stability of the materials of this invention.

The instability of friction coefficient with change in temperature for the conventional brake lining materials is immediately apparent from examination of curves 1 and 2. The friction coefficient at atmospheric temperature of about 0.38 rises rapidly to about 0.48 at 120° F., drops off to about 0.43 at 170° F., remains fairly stable to about 480° F., then drops off on a steep slope to about 0.24 at 600° F., and at about 660° F. drops further to less than 0.20 at about 700° F. While this curve shows characteristics which are considerably below the ideal, the material is usable and is used in large quantities. However, on the cooling phase the instability of the friction coefficient of this material is much more pronounced, the friction coefficient first rising to about 0.22 at 550° F. and then dropping sharply with the next 100° F. temperature change to about 0.07. On continued temperature drop below about 325° F. the friction coefficient rises very rapidly on an irregular curve, to about 0.36 at 230° F., and remains fairly stable to 125° F.

The method of stabilizing the friction coefficient of a particular carbonaceous base material over the temperature range from atmospheric to about 800° F., and the resulting product, will now be described by way of example as a preferred embodiment of this invention.

The carbonaceous base material will be designated Grade A simply for purposes of identification. This material was prepared by mixing 100 pounds of petroleum coke, 50 pounds of graphite, 11 pounds of sulphur, 10 gallons of benzol, and 63 pounds of soft pitch together. The sulphur is for the purpose of increasing the coking value of the pitch, which results in a higher bonding strength. The benzol, used to give better distribution of the pitch through the mix, volatilizes and comes off during the mixing operation, after it has served its purpose. Mixing was done for 3 hours at room temperature and continued for approximately 5 hours more at a temperature maintained between 125° C. and 140° C. The mixed material was molded to desired shape and size at pressure of 4 tons per square inch and then was baked for 6 days to 1500° F.

The curve 3 shows the friction coefficient-temperature relation for the material Grade A on rising temperatures, and curve 4 shows the friction coefficient-temperature relation for this material on falling temperatures. From inspection of these curves it is evident that the material Grade A falls short of the optimum standards for automobile brake material set forth hereinabove.

A preferred embodiment of the improved brake friction material will be designated Grade B simply for identification. The base for this material comprises the same ingredients as in Grade A, in similar proportions, and mixed as above described. Following this mixing operation there was blended into the mixture 7% of boron carbide and 3% of wollastonite, both by weight, and both 325 mesh. The wollastonite used in the embodiment being described was the Godfrey L. Cabot, Inc., Wollastonite P–1. The blended material was molded to desired shape and size at 3½ tons per square inch and then baked for 6 days to 1500° F.

Curves 5 and 6 show the friction coefficient-temperature relation for material Grade B on rising and falling temperatures, respectively. The greatly improved friction characteristics of this material over the temperature range to about 800° F. are outstanding. The friction coefficient, initially about 0.37, drops gradually to about 0.31 at 150° F., remains stable to 230° F., and then begins a rise to about 0.41 at 340° F., where it levels off to about 610° F., rising to about 0.43 at 630° F., where it remains stable to nearly 750° F. On falling temperature the friction coefficient drops gradually to about 0.38 at 620° F., remains fairly stable to about 220° F., and then gradually drops to about 0.31 at 130° F. These curves closely approach the optimum requirements described above. The improvement in stability of the friction coefficient of the base material, Grade A, by addition of the boron carbide and wollastonite is very substantial and is unexpected. The advance over the commonly used phenolic resin-asbestos type material is important.

Physical data on these compositions Grade A and Grade B are set forth in Table I.

TABLE I

| Material | Apparent density, g./cc. | Specific resistance, o.p.i.c. | Monotron hardness, 30/5000 | Scleroscope hardness | Flexural strength, p.s.i. |
|---|---|---|---|---|---|
| Grade A | 1.65 | .00280 | 60 | 54 | 2,500 |
| Grade B | 1.63 | .00485 | 75 | 60 | 3,280 |

The material Grade B described herein is a preferred embodiment of this invention. However, the proportions of boron carbide and wollastonite blended into the base material, Grade A, may vary and still accomplish the objects of this invention. I have found that the amount of boron carbide may vary between about 7% and about 10%, by weight, of the base material, and the amount of wollastonite may vary between about 3% and about 5%, by weight, of the base material.

While I have described a particular preferred embodiment of my invention, various modifications may obviously be made without departing from the true spirit and scope of the invention intended to be defined in the appended claims.

I claim:

1. The method of stabilizing the friction coefficient of an essentially carbonaceous base material between about 0.25 and about 0.45 over a temperature range from atmospheric temperature to about 800° F. which consists of including in the carbonaceous base material boron carbide in amount from about 7% to about 10% by weight thereof, and wollastonite in amount from about 3% to about 5% by weight thereof.

2. The method of stabilizing the friction coefficient of a carbonaceous base material comprising essentially carbon and graphite between about 0.25 and about 0.45 over a temperature range from atmospheric temperature to about 800° F. which consists of including in the carbonaceous base material boron carbide in amount about 7% by weight thereof, and wollastonite in amount about 3% by weight thereof.

3. A brake friction material having a coefficient of friction stable between about 0.25 and about 0.45 over a temperature range from atmospheric temperature to about 800° F. and comprising a carbonaceous base consisting essentially of a mixture of carbon and graphite, in which the ratio of carbon to graphite is about 2 to 1, and about 7% by weight thereof of boron carbide, and about 3% by weight thereof of wollastonite.

References Cited

UNITED STATES PATENTS

| | | | |
|---|---|---|---|
| 2,818,634 | 1/1958 | Butchelor et al. | 106—36 X |
| 2,819,681 | 1/1958 | Luvisi | 106—36 X |
| 3,003,860 | 10/1961 | Sermon et al. | 51—308 X |
| 3,014,884 | 12/1961 | Bray | 106—36 X |

FOREIGN PATENTS 865,163   4/1961   Great Britain.

JULIUS FROME, *Primary Examiner.*

J. B. EVANS, *Assistant Examiner.*

U.S. Cl. X.R.

51—308; 106—38.9, 38.28; 152—211, 212; 188—255, 256, 257, 258; 192—107, 112